May 17, 1960   J. N. GRAEF   2,936,686
STEREOSCOPIC CAMERA
Filed Jan. 25, 1956   3 Sheets-Sheet 1
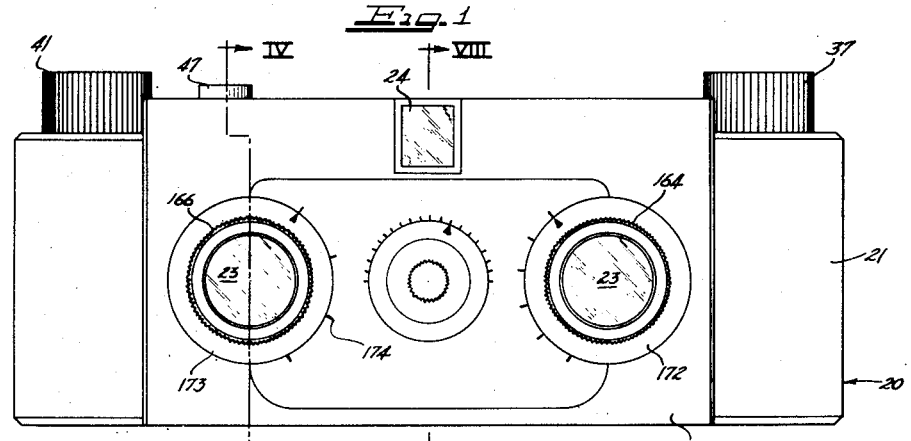
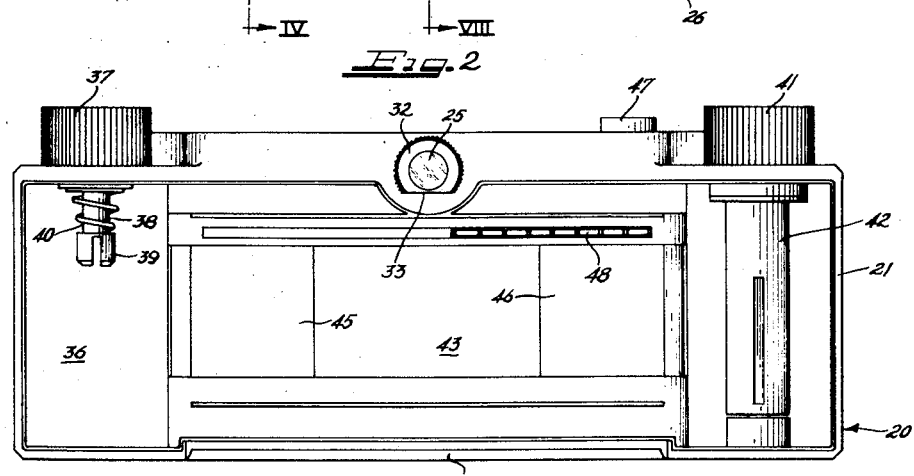
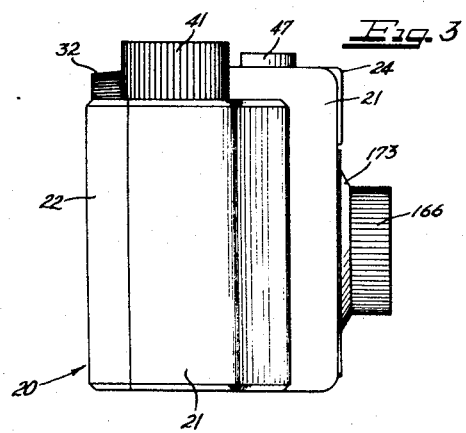
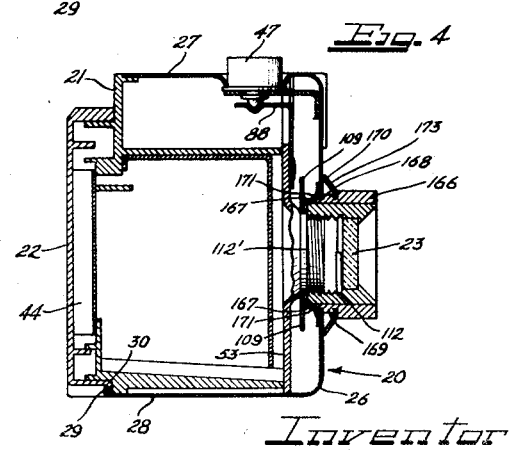
Inventor
JOHN N. GRAEF May 17, 1960  J. N. GRAEF  2,936,686
STEREOSCOPIC CAMERA
Filed Jan. 25, 1956  3 Sheets-Sheet 2

Inventor
JOHN N. GRAEF
by Hill, Sherman, Meroni, Gross & Simpson Attys.

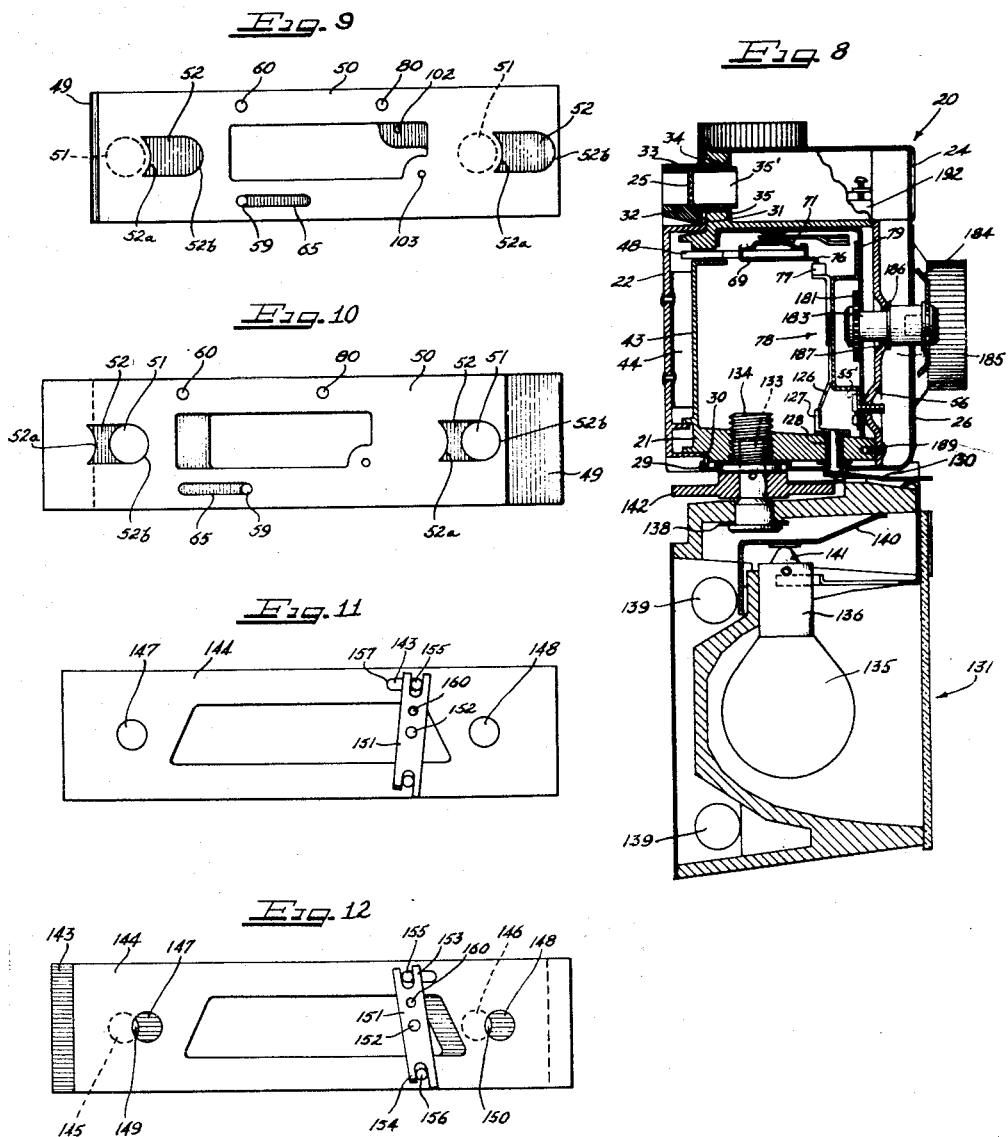

United States Patent Office 2,936,686
Patented May 17, 1960

2,936,686
STEREOSCOPIC CAMERA
John N. Graef, Arlington Heights, Ill.

Application January 25, 1956, Serial No. 561,234

2 Claims. (Cl. 95—18)

The present invention relates to photographic equipment, and more particularly to a stereoscopic or binocular camera.

Photographic equipment and instruments for stereoscopic photography wherein a pair of pictures are taken of substantially the same view but from a pair of laterally spaced positions whereby different viewing angles are present, have heretofore been constructed and designed in numerous forms. Originally, stereoscopic photography was effected by taking two successive pictures of the same view from two different positions by utilizing the same camera and resetting the same at the two different and laterally spaced positions. Recently, however, there has been important developments in this art and an increasing popularity attending those developments. For example, the photographer now has available to him several makes and models of cameras which are operable to take two pictures of the same view from two laterally spaced positions by a single setting of the camera and a single manipulation of the shutter control. These cameras have pairs of spaced lenses with a shutter mechanism for each lens to be released by a single shutter control.

While these stereoscopic cameras have become increasingly popular, many technical difficulties attending the efficiency thereof have confronted the users and the manufacturers of these cameras. Additionally, these cameras have been extremely expensive units not only due to their use of two sets of lenses, but also due to their independent shutters which form a major part of the cost of such a photographic instrument.

In accordance with the present invention, however, the cost of a stereoscopic camera has been substantially reduced and the efficiency thereof has been highly improved by providing the camera with a single shutter mechanism operable to simultaneously expose a pair of film portions. Whereas many of the heretofore known types of shutter controls and shutter arrangements in stereoscopic cameras were ineffective to simultaneously open and close the shutter apertures, a shutter arrangement constructed in accordance with the principles of the present invention operates to positively simultaneously open and close both shutter apertures.

It is, therefore, an important object and feature of this invention to provide a new and improved stereoscopic camera with a new and improved shutter mechanism operable to positively simultaneously open and close a pair of shutter apertures.

Another difficulty which has attended the utilization of independent shutters resided in the independent timing or time of exposure thereof even though the camera itself was provided with a single time control.

Shutters embodying the principles of this invention, however, utilize a single time set arrangement with a single shutter actuator whereby both shutter openings of this improved shutter structure are simultaneously opened and simultaneously closed for the single time period set on the shutter.

It is, therefore, an important feature and object of the present invention to provide a new and improved shutter for a stereoscopic camera with a single actuator and a single timing means whereby both shutter openings are simultaneously closed and simultaneously opened.

Still another important feature of the present invention lies in the manner of opening and closing of the shutter apertures whereby they have an exposure curve which more closely resembles a square curve than the equivalent curve of shutters heretofore employed in stereoscopic camera shutters.

It is, therefore, another important feature of the present invention to provide a new and improved shutter structure operable to be substantially fully open for its set time period and to open and close substantially instantaneously upon actuation thereof.

Another object of the present invention is to provide a new and improved time control mechanism for a camera shutter.

Still another object of the present invention is to provide a new and improved shutter release mechanism for photographic equipment.

Still another object of the present invention is to provide a new and improved shutter mechanism for photographic equipment generally and for stereoscopic cameras particularly.

Still another object of the present invention is to provide a new and improved film advancing mechanism for a stereoscopic camera to positively advance a measured length of film. In stereoscopic cameras it has been a problem of the art to positively advance a substantially precise measured length of film. The precision of the length of film advanced in a stereoscopic camera is important since that length of film to be advanced must be slightly greater than the longitudinal dimension, on the film, of at least two frame exposures.

Still another object of the present invention is to provide a new and improved film advancing structure which is effective to positively engage the film and to safely engage the same without danger of stripping the film. Herein it is noted that 35 mm. film such as is in common use in stereoscopic cameras, is perforated along at least one edge thereof for engagement by a tooth structure such as a sprocket or gear or rack.

Still another object of the present invention is to provide an improved aperture control for determining and setting the size or "speed" of the aperture through which the light is to pass to the film.

Still other objects, features and advantages of the present invention will become readily apparent from the following detailed description of the present invention and an embodiment thereof, from the claims, and from the accompanying drawings in which each and every detail shown is fully and completely disclosed as a part of this specification, and in which like reference numerals refer to like parts, and in which:

Figure 1 is a front elevational view of a stereoscopic camera embodying the principles of this invention;

Figure 2 is a back elevational view of the camera of Figure 1 with the back cover removed therefrom;

Figure 3 is a side elevational view of the camera of Figures 1 and 2;

Figure 4 is a sectional view of the stereoscopic camera of Figure 1 viewed as taken substantially along the line IV—IV of Figure 1 and shown with certain parts omitted therefrom for clarity;

Figure 8 is a sectional view of the camera viewed as taken substantially along the line VIII—VIII of Figure 1 and is viewed with certain parts thereof removed for clarity and certain other parts thereof broken away to illustrate additional details of the invention;

Figure 9 is an elevational view of a pair of shutter elements shown in a closed relation;

Figure 10 is a view of the shutter elements of Figure 9 in an open relation;

Figure 11 is a view of a pair of aperture or diaphragm elements shown in a relation of maximum aperture; and Figure 12 is another view of the elements of Figure 11 but arranged in a minimum aperture or diaphragm relation.

Figure 5:
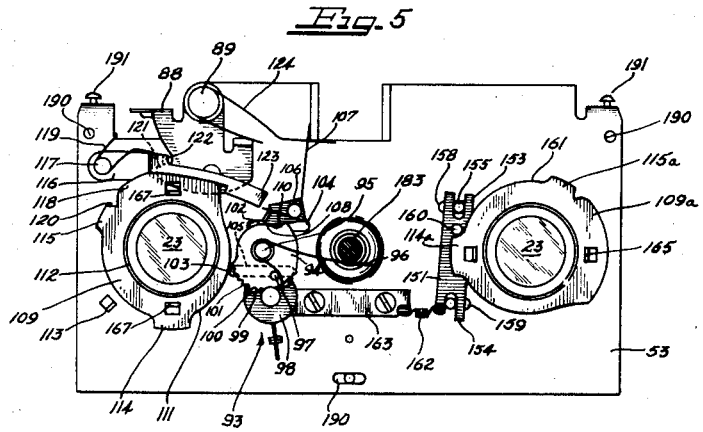
Figure 5 is a front elevational view of the control plate removed from the camera showing certain parts thereon in operational position.

There is illustrated in these drawings a stereoscopic camera 20 embodying the principles of this invention and including therein mechanism operable in accordance with this invention. The camera 20 has a housing or casing 21 which is cooperative with a back plate 22 to enclose the operating mechanism of the camera. Exposed, of course, are a pair of laterally spaced horizontally aligned lenses 23—23 which are spaced a distance substantially equal to the average human ocular spacing so that viewing of pictures exposed by these lenses will permit a viewing sensation substantially the same as that which would occur if the viewer were actually seeing the scene in lieu of the photographic exposures of the scene. Sighting the camera, however, does not require biocular visual perception but may be effected through a single sighting passage having a viewing lens 24 at the front of the camera and an eye lens 25 at the back of the camera. The viewing or sighting lens 24 is mounted on a front cover plate 26 on the camera housing 21. This front cover plate is bent at the top and bottom of the camera and extends rearwardly from those bends, as at 27 and 28 to the back edge of the housing 21 where it is secured to the casing. The rearwardmost edge of the lower rearward extending portion 28 of the cover plate 26 is then bent upwardly and is operative as a portion of a hinge connection, as at 29 for the back cover 21.

A downward lip 30 on the innermost and lowermost edge of the back cover 21 engages the upstanding bent edge 29 of the cover plate to hingedly fix the back cover to the casing (Figures 4 and 8), while an upstanding lip on the innermost and uppermost edge of the back cover 22 in the center region thereof, is engaged by a rotatable lock 32. This rotatable lock 32 has a flattened portion 33 to permit the lip 31 to be moved into and away from a closed position for the back cover and to further accommodate removal of the cover 22 from the casing 21. When in a closed position, the lock may be rotated so that the flattened portion 33 is away from a mating or cooperating position with the lip 31 whereby the annular remainder of the lock 32 will bear against the lip 31 and hold the same and the cover 22 in a closed position on the casing 21 (note Figure 8). This cover lock 32 is also effective as an object lens mounting and is, for that purpose, provided with a stepped aperture therethrough with the eye lens 25 pressed into the aperture and against a shoulder step 33 therein. To mount the lock 32 in place on the casing 21, the body of the lock extends through an annular aperture 34 in the housing and a split flange 35 on the body of the lock 32 fixes the same in position. A lens retainer 35' disposed within the lock 32 backs up the split flange 35 and holds the eye lens 25 within the lock.

When the lock is in the position shown in Figure 2, the back cover 22 may be removed so that a film cartridge may be disposed in a cartridge recess 36 in the casing 21. To place a standard 35 mm. film cartridge in the receiving recess 36, however, it is necessary to withdraw the rewind knurled knob 35 and shaft 38 having a bifurcated head 39 and being center spring loaded by a conical spring toward the recess by a spring 40 between the head 39 and the casing 21. When the cartridge is in the recess 36 release of the rewind knurled knob 37 permits the bifurcated head 39 to lock with the spool of the film cartridge so that on completion of the exposure of the film, the rewind knob 37 may be rotated to thus rewind the film into the cartridge.

At the other lateral end of the casing 21 from the cartridge-receiving recess 36, the camera is provided with a wind or film advance knurled knob 41 rotatably connected to a film winding spool 42 whereby rotation of the winding knob 41 will rotate the spool 42 and advance film forwardly within the camera.

The film is advanced when wound on the spool 42, across a back plate and framing plate 43 on the casing 21 and is pressed thereagainst by a spring plate 44 secured to the back cover. A pair of laterally spaced framing apertures 45 and 46 in the framing plate are effective as frame apertures for the simultaneous exposure of a pair of images on the film when the shutter is released and the lenses are opened through the aperture plates.

Figure 7:
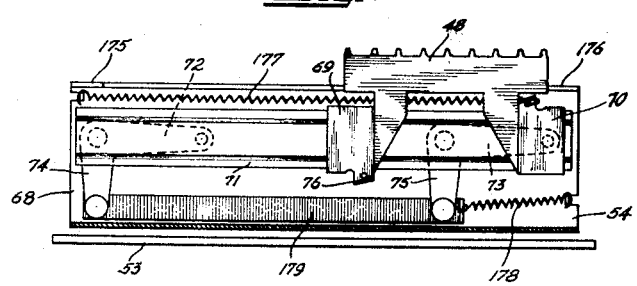
Figure 7 is a bottom plan view of the control plate with certain portions thereof removed for clarity and is further described as a sectional view of the control plate viewed as taken substantially along the line VII—VII of Figure 6.

With this structure the advancement of film, in accordance with the principles of the present invention, is also effective to reload or "cock" the shutter whereby the exposure of a second pair of framed images may be effected merely by advancing the film and thence releasing the shutter as by pressing the shutter release button 47 to release the shutter as hereinafter described. The loading of the shutter by advancing the film is effected through the cooperation of the film and a toothed rack 48 (Figures 2, 7, and 8) which is a part of the shutter mechanism and advances with the film to load or "cock" the shutter.

Before undertaking to understand the mechanism by which the shutter is opened and closed, the opening and closing character of the shutter itself should be understood, and to this end reference is now had to Figures 9 and 10 wherein shutter plate elements are illustrated in open and closed positions, respectively. In these figures there is shown a pair of shutter plates 49 and 50 which are respectively the front shutter plate and the rear shutter plate. The front shutter plate 49 is provided with a pair of laterally spaced apertures 51—51, the spacing between which being the same as the spacing between the centers of the lenses 23—23. The rear shutter plate 50 is provided with a pair of spaced apertures 52—52 which are similarly spaced by a distance equal to the distance between the spacing of the centers of the lenses 23. When the shutter is cocked the plates will be substantially superimposed as shown in Figure 9 and so placed with respect to the lenses, as hereinafter described in structural detail, that the apertures 51—51 on the front plate 49 lie directly behind and in line with the lenses 23. The rear plate has the apertures 52—52 so disposed thereon that they do not overlie the apertures 51—51 but are laterally displaced therefrom. Upon release of the shutter mechanism, the rear plate 50 is moved to the left, as viewed in Figures 9 and 10, to a position shown in Figure 10 whereupon the apertures are aligned and focused light is passed therethrough to the film from the lenses 23—23. As a second step in the release of the shutter mechanism, the front plate 49 is moved to the left so that the apertures 51—51 are covered by parts of the rear plate 50 as illustrated in Figure 9 except that now both plates are disposed to the left of the position shown in Figure 9 and are superimposed at a position such as that shown for the plate 50 in Figure 10.

Figure 6:
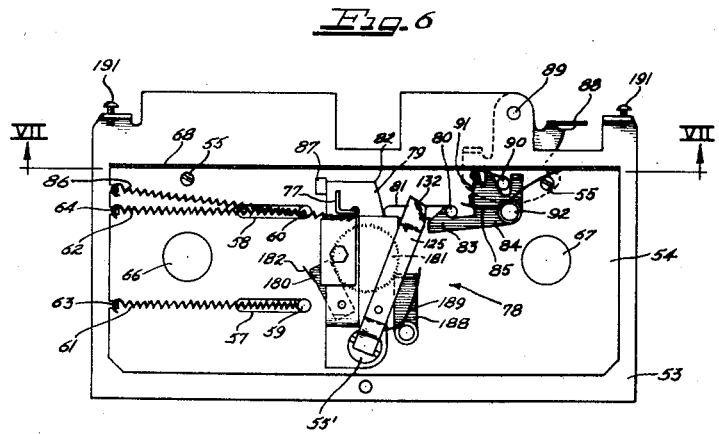
Figure 6 is a back elevational view of the control plate with portions removed for clarity.

The shutter plates 49 and 50 are slidably mounted on the back face of a control plate 53 and held in position by a shutter assembly bracket 54 secured to the plate 53 by a plurality of screws 55—55 but spaced from the plate 53 by standoff offset regions 56 (Figure 8) on the plate 53. The bracket 54 has a pair of slots therein 57 and 58 (Figure 6) to accommodate pins 59 and 60, respectively, on the front and rear shutter plates 49 and 50, respectively. When the shutter is cocked, and the plates are at their right-handmost position, as shown in Figure 6, a pair of springs 61 and 62 are tensioned between the pins 59 and 60 and a pair of ears 63 and 64 bent from the left edge of the bracket 54. In a manner hereinafter described in detail, the rear plate 50 is first released whereby the spring 62 causes the pin 60 to move to the left in the slot 58 and thereby moves the rear plate 50 to the left. After the set time interval for exposure, the front plate is then released so that the spring 61 will move the pin 59 to the left through a slot 57 in the bracket 54 and through a slot 65 in the rear plate 50 to move the front plate 49 to the left. Between the two steps of shutter opening and closing, the shutter apertures are aligned and are further aligned with a pair of apertures 66 and 67 in each of the plates 53 and 54 to permit the passage of light from the lenses to the film.

To reload the shutter and thus to move the shutter plates to the right to a cocked position as shown in Figures 9 and 6, the upper portion 68 of the control plate bracket 53, which is at right angles to the portion of the bracket plate 54 fixed to the control plate 53 carries the rack 48 which is advanced by the film, when the film is advanced, to load the shutter. The rack 48 is secured to a pair of runners 69 and 70 which slidably engage a track 71 pivotally carried on arms 72 and 73 of a pair of cranks 74 and 75 which are, in turn, pivotally mounted on the upper portion 68 of the bracket 54. The leftmost runner 69 has a forwardly extending portion bent downwardly as an ear 76 operable to engage an ear 77 on a pivoted shutter-loading and counter assembly 78 (Figures 6 and 8). A shutter loading cam plate 79 in this assembly 78 is effective to engage a second pin 80 on the rearward shutter plate 50 when the ear 76 on the runner 69 engages the ear 77 on the shutter loading assembly 78 to move the shutter loading plate 79 pivotally clockwise about the axis of mounting screw 55' when the rack 48 is advanced by advancing the film. Prior to advancing the film, the pin 80 is at its leftmost position, as shown in Figure 10, and is at the leftmost extremity of an accommodating slot 81 in the bracket 54. As the rack 48 is moved to its advanced position or rightmost position, the ear 76 engages the ear 77 thus rotating the assembly about the pivot 55' whereby the right or cam edge 82 of the plate 79 moves the pin 80 to the right until it is caught in a hook end 83 of a shutter-holding crank 84 pivotally mounted on the bracket 54 and biased by a spring 85 upwardly. After the pin 80 is caught by the hook end 83 of the crank 84, the ear 76 advances past engagement with the ear 77 whereby the counter and shutter-loading assembly 78 is released to return to its normal position as shown in Figures 6 and 8. Return movement thereof is effected by biasing forces exerted from spring 86 and the assembly is stopped by a formed stop 87 on the bracket 54.

Movement of the pin 80 to the right to be caught by the shutter-holding crank 84 is effective to move both shutter plates 49 and 50 to the right simultaneously without superimposing the apertures 51 with the apertures 52 since the trailing or left end of the aperture 65 in the rearward shutter plate 50 will engage the pin 59 on the forward shutter plate 49 and thereby carry both plates to the right to a loaded or "cocked" position as shown in Figure 6.

The shutter is releasable from the holding crank 84 by depressing the shutter release button 47 which, in turn, engages a shutter release crank 88 (Figures 4 and 6) hingedly mounted as at 89, on the plate 53. A pin 90 on the shutter release crank 88 extends rearwardly through both the plate 53 and the bracket 54 to engage a camming face or edge of a second arm 91 on the crank 84. Depression of the shutter release button 47 causes the shutter release crank 88 to be moved clockwise as viewed in Figure 6 to thereby cause the pin 90 to ride on the cam face of the arm 91 and move the crank counterclockwise, as viewed in Figures 6, about its pivot 92 until the hook end 83 is moved a sufficient angular distance to release the pin 80 on the shutter plate 50 and thereby permit the stepped operation of the shutter opening and closing.

The hereinabove described stepped operation and movement of the shutter plates is controlled by an escapement timing mechanism 93 mounted on the front of the plate 53, as seen in Figure 5. This escapement assembly includes a peripherally toothed rotatable escapement wheel 94 rotatably mounted on a pin 95 and biased in a clockwise direction as viewed in Figure 5 by a spring 96 engaging a pin 97 on the wheel 94. In addition, the escapement assembly or mechanism 93 includes an oscillating lever-like wheel 98 having a cutaway portion 99 and a pair of teeth 100—100 disposed in position to alternately engage the teeth 101 on the wheel 94.

The shutter plates 49 and 50 have secured thereto pins 102 and 103 which extend forwardly therefrom, respectively, through slots 104 and 105, respectively, in the plate 53 and moved simultaneously from right to left in Figure 5 when the shutter is moved from a released position to a loaded or "cocked" position, as seen in Figure 5. When the shutter is released by depression of the shutter release button 47, the pin 102 is held in its leftmost position, as seen in Figure 5, by a dog 106 pivoted on the plate 53 and biased in a counterclockwise direction by a spring 107 against a cam edge 108 on the wheel 94. The pin 103 on the plate 50 is not so held, however, and moves to the right in Figure 5 until it engages the pin 97 on the wheel 94, which pin extends through the wheel 94, whereupon the pin 103 urges the wheel 94 to move in a counterclockwise direction against the biasing forces of spring 96 and the action of the escapement cooperation between the wheel 94 and the lever-like wheel 98. After a measured rotation of the wheel 94, as set by a rotatable cam 109, as hereinafter described, a cam edge 110 on the wheel 94 deflects the dog 106 in a clockwise direction as viewed in Figure 5 to release the pin 102 on the shutter plate 49 to release the same for closing the shutter apertures which are otherwise now open by movement of the plate 50. Thereupon the pin 102 moves to the right, as seen in Figure 5, in the slot 104.

Upon resetting the shutter mechanism by advancement of the film and advancement of the rack 48, both pins 102 and 103 are moved to the left in Figure 5 permitting the toothed wheel 94 to move in a clockwise direction until it engages a cam edge 111 on the cam 109. The cam 109 (Figures 4 and 5) is rotatably disposed on a lens mount assembly mounting boss 112' secured to the plate 53 or formed as a part thereof.

This timer cam 109 is rotatable between limits defined by a stop 113 on the plate 53 cooperating with radial extensions 114 and 115 on the cam 109. The angular spacing of the radial extension cam stops 114 and 115 is sufficiently great to permit the cam 109 to be rotated to such an extent that substantially all parts of the cam edge 111 may be successively placed in position to be engaged by the leading tooth on the escapement wheel 94. Since the various points on this cam edge 111 are of different radial distance from the center of rotation of the cam 109, different settings of the cam 109 will effect different return rotation angular distances for the toothed escapement wheel 94. When the cam is rotated to a maximum counterclockwise position such that the extension stop 115 engages the stop 113, the maximum radial portion of the cam edge 111 will be engaged by the leading tooth of the escapement wheel 94 so that the wheel 94 will have a minimum counterclockwise return rotation. With such a setting of the timer cam 109, release of the shutter will require the pin 103 to rotate the escapement wheel 94 only through a minimum counterclockwise rotation before the edge 110 engages the dog 106 to release the pin 102. An intermediate setting of the timer cam 109, such as the intermediate setting shown in Figure 5, will require a greater rotation of the escapement wheel 94 before the pin 102 is released to slide in the slot 104. By operation of the escapement mechanism 93 and the cooperation of the escapement wheel 94 with the escapement lever-like wheel 98, the intermediate setting 105 will result in a greater delay between the movement of the pin 103 and the movement of the pin 102. This, of course, means that at an intermediate setting the shutter apertures in the plates 49 and 50 will be superimposed or "open" for a greater period than the period of "opening" when the timer cam is set at a maximum counterclockwise position.

Setting of the timer cam 109 in a maximum clockwise position not only effects maximum time delay between the movement of the shutter plates but also permits an extended manually controllable or timer controllable time delay between movement of the shutter plates, respectively, in that the mechanism is provided with a dog stop arm 116 pivoted on the plate 53, as at 117, and biased against a second cam edge 118 on the timer cam 109 by a spring 119. A notch 120 in the counterclockwise-most limit of the cam edge 118 permits the dog stop arm or lever 116 to move slightly in a clockwise direction when the cam 109 is moved in a maximum clockwise direction and the dog 116 is released by depression of the shutter-release button 46 and movement of the shutter release crank 88 about the pivot 89. For this purpose, the crank 88 has an arm 121 engageable with an ear 122 on the arm 116 to hold the same out of the notch 120 at all times other than when the shutter-release button 47 is depressed. When the shutter release button is depressed, however, and the arm is permitted to fall into the notch 120, the head 123 of the dog stop arm 116 will move to a position adjacent to the dog 106 thereby preventing the dog from releasing the pin 102 until the arm 116 is raised by release of the shutter-release button 47 and movement of the shutter-release crank 88, as the same is biased by the spring 124.

Thus, the operation of the shutter mechanism for time delay shutter closing is as follows. First, the cam 109 is rotated to a maximum clockwise position such that the notch 120 underlies the dog stop arm 116 and the shutter is loaded or "cocked" as described hereinabove. Thereafter, the shutter-release button 47 is depressed thereby rotating the shutter-release crank in a counterclockwise direction as viewed in Figure 5. This releases the rearward shutter plate 50 as hereinabove described whereby the pin 103 moves to the right (in Figure 5) rotates the escapement wheel 94 until the cam edge 110 thereof engages the dog 106. The dog 106 cannot now move to release the pin 102, however, since the dog stop arm 116 has dropped into the notch 120 and the head 123 of the arm holds th edog 106 in a stopped position. Release of the button 47, however, permits the crank 88 to be moved in a clockwise direction as view in Figure 5 under the biasing force of spring 124, thereby raising the dog stop arm 116 out of the notch 120 and raising the head 123 of the arm away from the dog 106. Then the cam edge 110 of the wheel 94 will raise the dog 106 under the force of the pin 103 acting against the pin 97 on the wheel 94. This will release the pin 102 to move to the right, in Figure 5, in the slot 104 thereby moving the plate 49 to close the shutter. The time of depression of the shutter-release button 47, during this cycle of operation, thus controls the time during which the shutter apertures are superimposed or "open."

Referring to Figures 6 and 8, the shutter-loading and counter assembly 78 also forms a part of a photoflash energization circuit together with a photoflash attachment, such as shown in Figure 8, and as described in detail in my copending application for patent entitled "Photoflash Attachment," U.S. Serial No. 561,233, filed on even date herewith. To that end, the pivoted plate 79 carries a contact strip 125 insulatingly secured thereto so as to be fixed to the plate 79 but out of electrical engagement therewith. At its lower end (Figure 8) the strip 125 which is formed of an electrical conducting material such as strip copper or the like, is bent rearwardly as at 126 to lie in electrical engagement with a conductive contact bracket 127 which is secured to the base of the casing 21 but insulated therefrom by an insulating grommet 128. A pin 129 is also secured to the bracket 127 and extends downwardly therefrom through the grommet 128 to a position below the base of the casing 21 to make electrical engagement with a contact strip 130 on the photoflash attachment 131. The other end 132 (Figure 6) of the contact switch strip 125 is bent forwardly and upwardly to overlie the slot 81 in the bracket 54 through which the pin 80 moves when the shutter is being loaded or released.

When the shutter is released, the pin 80 will move to the left in Figure 6 through the slot 81 and make electrical contact with the end 132 of the switch strip 125 thereby closing the electrical circuit to the casing 21. This will close the circuit for the photoflash attachment 131 since the other terminal 133 of the photoflash attachment is in electrical engagement with a screw bushing 134 in the base of the casing 21. The screw bushing 134 thus also serves as a contact to the flash attachment 131 in addition to operating as a securing screw for the front plate 26 in that it extends through an appropriate aperture in the bottom portion 28 thereof.

When the switch is closed in the described manner, a flash bulb 135 in the photoflash attachment will be energized through connection of one terminal 136 thereof through a shield mounting bracket 137 to the contact strip 130 which is connected through the pin 129 and the switch including the strip 125 and pin 80 to the casing 21 and to the screw bushing 134. From the screw bushing 134 the circuit closes through a screw terminal 133 which is electrically connected to a contact strip 138 that is in electrical connection with batteries 139 which are also in electrical circuit with a further contact strip 140 which contacts the second terminal 141 of the flash bulb 135. The precise details and construction of the photoflash attachment 131 are, of course, fully and completely found in my hereinabove identified copending application for patent. Herein it is noted, however, that the flash attachment 131 readily attaches to the underside of the camera by screwing the screw terminal 133 into the bushing 134 by rotation of the knurled wheel 142 provided for that purpose.

As a feature of this invention, the switch for energizing the flash bulb 135 closes only when the shutter is released, however, and does not close when the shutter is being loaded or "cocked" since during the loading operation the pin 80 does not make contact with the end 132 of the strip 125. As hereinabove explained, during the loading operation, the plate 79 is rotated in a clockwise direction to move the pin 80 to the right in Figure 6 by action of the cam edge 82 on the plate 79. Since the strip 125 is secured to the plate 79, it will also be moved clockwise during the loading operation whereby it will be removed from its position overlying the slot 81 while the pin is being moved to its loaded position as shown in Figure 6. After the shutter is loaded and the plate 79 moves back to its normal position against the stop 87, the switch strip 125 will also move back to its normal position overlying the slot 81. The length of the strip 125 is such that it will not make contact with the pin 80, however, while it is moving counterclockwise to its normal position. This operation of the photoflash switch and synchronizing switch will prevent any possibility of energizing the photoflash attachment except at such time as when the shutter is released for opening.

As is well known in the photographic art, photographic equipment, in order to produce quality photographs, is equipped with not only time control for the shutter but also diaphragm or aperture size or "speed" control means operable to vary the diaphragm opening size or "speed." To this end, the present invention includes such means operable to vary the aperture for the passage of light from the lenses to the film.

With reference to Figures 11 and 12, diaphragm control in accordance with the principles of the present invention is effected by a pair of plates 143 and 144 each having a pair of apertures 145—146 and 147—148, respectively, which are laterally spaced apart by a distance equal to the distance between the axial centers of the lenses 23—23. These plates are shiftable with respect to each other so that the apertures in the plates may be superimposed with each other, as shown in Figure 11, or offset with respect to each other as shown in Figure 12, or offset with respect to each other by any intermediate dimension between the positions shown in Figures 11 and 12.

When the apertures 145 and 147 are superimposed and the apertures 146 and 148 are superimposed, there is a maximum diaphragm opening while when these apertures are offset with respect to each other there is a minimum opening as indicated at 149 and 150 in Figure 12. These minimum apertures 149 and 150 will be centrally disposed with respect to the lenses 23—23 (Figures 1 and 5), and it will be understood, of course, that all diaphragm openings for settings of the plates 143 and 144 will be centrally disposed with respect to the lenses 23—23 so the focused light from the lenses will pass through the apertures to the film portions to be exposed.

The shifting of the plates 143 and 144 with respect to each other to vary the aperture settings for the camera is effected by pivoting movement of a lever 151 pivotally secured to the control plate 53 by a pin 152. The lever 151 has a pair of bifurcated ends 153 and 154 which receive a pin 155 on the plate 143, and a pin 156 on the plate 144, respectively. The pin 155 extends through a slot 157 in the diaphragm plate 144 and through a slot 158 (Figure 5) in the front of the control plate 53. At the same time, the pin 156 extends forwardly through a slot 159 in the control plate 153 whereby the aperture or diaphragm plates 143 and 144 may be mounted on the bracket plate 54 in front of the shutter plates 49 and 50 and in front of a spacer plate between the shutter plates and the diaphragm plates, while the aperture control lever 151 may be disposed in front of the control plate 53.

With this arrangement, disposition of the control lever in a clockwise position as viewed in Figures 5, 11 and 12, will superimpose the apertures in the two plates respectively while disposition of the control lever 151 in a counterclockwise direction will offset the apertures in the plates toward a minimum aperture setting as viewed in Figure 12. Control positioning of the aperture control lever 151 is effected by providing a pin 160 thereon which bears clockwise against a cam edge 161 on a cam disk 109a, by force of a biasing spring 162 secured to one of the arms of the bifurcated end 154 of the lever 151 and secured to a mounting bracket 163 fixed to the front of the control plate 53. The cam 109a is mounted for concentered rotation about the center of the lens 23 and the cam edge 161 has a varying radial dimension from the center of the lens 23 so that maximum clockwise rotation of the cam 109a whereby the stop 114a engages the pin 160 and permits maximum clockwise movement of the lever 151 for maximum aperture as viewed in Figure 11 while counterclockwise rotation of the cam plate 109 whereby the stop 115a is engaged by the pin 160 will move the pin counterclockwise to its maximum position for minimum aperture setting of the plates 143 and 144 as viewed in Figure 12.

Controlled rotation of the cam plate 109a is effected through controlled manual manipulation of a knurled knob 164 mounted on a lens carrier for the right hand lens 23 of Figure 1, the engagement between the knob 164 and ears 165 of the cam 109a being the same as the engagement between the knob 166 mounted about the other lens and engageable with ears 167 on the cam 109 as viewed in Figure 4.

In Figure 4 it will be seen that the knurled knob 166 is mounted at the front of the front cover plate 26 projecting through an aperture 168 therein and secured in place between a shoulder 169 on the knob and a clamping spring ring 170. A pair of slots 171 in the rearward end of the knob 166 engage the ears 167 on the cam plate 109 whereby rotation of the knob 166 in the aperture 168 about the fixture carrying the lens 23 will control movement of the cam plate 109 for setting of the time for a shutter opening. As stated above, the knob 164 is mounted on the cover plate 26 in the same manner as the mounting of the knob 166 and engages the ears 165 of the cam plate 109a in the same manner that the knob 166 engages the cam plate 109. Thus the knob 164 controls diaphragm aperture settings while the knob 166 controls time settings. For this purpose, indicia markings of aperture settings are provided on the front cover of plate 26 with an indicator marked ring 172 fixed to the knob 164 for indication of the diaphragm aperture. In a like manner, the knob 166 carries an indicator ring 173 for indicating time settings for the shutter at indicia markings 174 on the cover plate 26.

In the general operation of the camera, film is loaded into the cartridge chamber 36 by removal of the back cover 22 after which film is threaded across the back 43 of the housing 21 and engaged by the winding spool 42. The cover is then replaced in position and secured by rotation of the knob 32 by less than 360°. The rack 48 is at this time engaged in apertures in the film and winding of the spool 42 by rotation of the knob 41 advances the film across the back 43 of the cover. The film advance is a precise measured film advancement since the rack 48 is movable by a precise measured distance between stops 175 and 176 on the bracket plate 54. This film advance length from a left hand position (Figures 2 and 7) to the right hand position (Figures 2 and 7) is limited to a distance of slightly more than two widths of frame apertures 45 and 46 and at the end of the film advancement the rack is held in the position shown in Figures 2 and 7 by its engagement with the apertures in the film. Release of the shutter in the hereinabove described manner is effected by a first stage of depression of the shutter release button 47 to expose the film segments overlying the apertures 45 and 46. Further depression of the shutter release button 47 causes movement of the rack linkage viewed in detail in Figure 7 whereby the rack is moved forwardly with teeth then disengaging from the apertures in the film, and a spring 177 then returns the rack to its left hand position against the stop 175. Release of the shutter release button releases the crank 88 whereby the rack linkage permits the rack 48 to re-engage apertures in the film since the linkage is returned to its normal position with the teeth of the rack 48 extending outwardly by action of the spring 178 connected between the plate 54 and a linkage coupling bar 179 pivotally connected to the ends of legs 74 and 75 of the cranks 72 and 73.

Each time the film is advanced and the shutter is cocked, the film counting mechanism is moved by a given angular increment through action of a pawl 180 pivotally connected to the pivoted plate 79 and resiliently biased against a ratchet wheel 181 by a spring 182. Rotation of the ratchet wheel 181 effects rotation of a counter shaft 183 (Figure 8) which carries an indicator dial 184 in front of its front cover plate 26 and correspondingly marked with indicia markings on the front cover plate 26 to indicate the number of pairs of exposures remaining to be taken on the film. A resilient friction spring washer 185 bears between a shoulder 186 on the shaft 183 and a boss 187 on the control plate 53 to prevent the counter shaft 183 from over-running; and a dog 188 pivotally fixed on the bracket plate 54 and resiliently biased against the ratchet wheel 181 by a spring 189 prevents the counter shaft from reverse rotation upon return of the counter mechanism 78 to its normal position as viewed in Figure 6.

In the general assembly of the camera, the bracket plate 54 is secured to the control plate 53 with the shutter plates and diaphragm plates and a spacer therebetween and the control plate 53 is then secured onto the casing 21 by screws 189 (Figure 8) passing through apertures 190 in the control plate 53. When loosely in place, the control plate 53 is adjusted for positive alignment on the casing 21 by a pair of horizontal aligning screws 191 threaded into rearwardly extending ears on the control plate 53 and abutting shoulders 192 on the upper portion of the housing 21. The front cover plate is then assembled onto the casing over the operating mechanism and is held in place by screws at the top thereof and the centered terminal bushing 134 on the bottom thereof. The rear cover 22 may then be assembled onto the camera in the manner described hereinabove and the camera is then in complete assembly and ready for operation after the insertion of a loaded film cartridge.

Timing accuracy of the exposure of film with this camera assembly is substantially greater than that provided by shutters of this type heretofore known and described above, since the apertures and the shutter plates are configurated to present a more nearly square wave exposure curve. That is, while the front shutter plate 49 has annular apertures 51, the apertures 52 in the rear shutter plate 50 are provided with left hand edges, as viewed in Figures 9 and 10, which are more or less semi-annular, as at 52a so that upon initial movement of the plate 50 to the left, the opening for light will develop from a crescent shaped aperture to a full annulus, the right hand edges 52b of the apertures 52 also being more or less semi-annular in the same direction as the edges 52a. Then, when the front shutter plate 49 moves to the left to close, the aperture will close from the annular opening to a crescent shaped opening, then close completely. Thus, the shutter opens quickly by the passage of the edges 52a across the openings 51 and then closes very quickly by the passing of the openings 51 under the edges 52a of the apertures 52. In a fully closed position of the shutter plates, the edges 52a are substantially concentric with the apertures 51, while in a fully open position the edges 52b are substantially concentric with the annulus 51.

This operating character of the shutter plates and this configuration of the apertures in the plates provides the shutter with an opening characteristic which is more nearly square when plotted. The advantage of such a square form shutter characteristic is one of the numerous important aspects of the present invention. It will be seen also that numerous variations and modifications may be made to incorporate the advantages of the present invention without departing from the true spirit and scope of the novel concepts and principles thereof. I, therefore, intend to cover all such modifications and variations as fall within the true spirit and scope of the novel concepts and principles of this invention.

I claim as my invention:

1. A stereoscopic camera comprising, a casing, a pair of laterally spaced lenses mounted on said casing, a pair of shiftable shutter plates mounted on said casing, said shutter plates each having a pair of apertures therein spaced apart a distance substantially the same as the lateral spacing between said lenses, means for mounting said shutter plates for relative shifting movement in a lateral direction between a first position where the apertures are out of alignment and a second position where the apertures are in alignment, means for relatively shifting said shutter plates into alignment from first to second position, and a time controlled means for shifting said shutter plates out of alignment from said second to said first position a predetermined length of time after being shifted to said second position, the apertures in one of said plates being circular, and the apertures in the other of said plates being elongated and having a concave arcuate leading edge so that a crescent-shaped opening will be formed through the apertures as the plates begin to shift from first to second position and having a semi-circular convex trailing edge to form an opening with rounded sides as the plates are located between first and second position, and to form a full circular opening as the plates are fully shifted to second position.

2. In a stereoscopic camera having a casing having first and second laterally spaced lenses mounted in said casing and having a diaphragm aperture control assembly with a pair of diaphragm plates with apertures aligned with each other and with a diaphragm adjusting cam rotatable about a center corresponding to said first lens and attached to the plates to shift their position and control the diaphragm opening, an improved shutter mechanism to simultaneously expose film portions to light focused by said lenses comprising a pair of shutter plates each having apertures spaced apart a distance substantially the same as the lateral spacing between the lenses and aligned with the apertures in the diaphragm plates, means for movably mounting one of the shutter plates for lateral shifting movement with respect to the other plate between a first position where the apertures in the plates are out of alignment and a second position where the apertures of the plates are in alignment, first means for shifting the movable shutter plate to bring it into said second position with its apertures in alignment with the other plate, second means for sequentially shifting the movable shutter plate an adjustable time later to said first position to bring the shutter apertures out of alignment, a time control means connected to said second means for variably adjusting said adjustable time, and a shutter cam mounted to rotate about the center of said second lens and connected to adjust said time control means with rotation whereby the shutter plates may be separately adjusted at a location different from the diaphragm plates.

References Cited in the file of this patent

UNITED STATES PATENTS

| Number | Name | Date |
|---|---|---|
| 369,997 | Simon | Sept. 13, 1887 |
| 1,032,297 | Richard | July 9, 1912 |
| 1,117,637 | Colardeau | Nov. 17, 1914 |
| 1,201,764 | Richard | Oct. 17, 1916 |
| 1,512,785 | Mittasch | Oct. 21, 1924 |
| 2,015,261 | Eckler | Sept. 24, 1935 |
| 2,247,809 | Hartman | July 1, 1941 |
| 2,256,355 | Riddell | Sept. 16, 1941 |
| 2,385,804 | Fitz | Oct. 2, 1945 |
| 2,664,799 | Wilkinson | Jan. 5, 1954 |
| 2,671,390 | Smith | Mar. 9, 1954 |
| 2,728,282 | Weiss | Dec. 27, 1955 |